US009224425B2

United States Patent
DiMare et al.

(10) Patent No.: US 9,224,425 B2
(45) Date of Patent: Dec. 29, 2015

(54) TIME STAMPED IMAGERY ASSEMBLY FOR COURSE PERFORMANCE VIDEO REPLAY

(75) Inventors: Joseph F. DiMare, North Palm Beach, FL (US); Mark G. DiMare, North Palm Beach, FL (US)

(73) Assignee: Skyhawke Technologies, LLC, Ridgeland, MS (US)

( * ) Notice: Subject to any disclaimer, the term of this patent is extended or adjusted under 35 U.S.C. 154(b) by 1999 days.

(21) Appl. No.: 12/337,332

(22) Filed: Dec. 17, 2008

(65) Prior Publication Data

US 2010/0149331 A1   Jun. 17, 2010

(51) Int. Cl.
| | |
|---|---|
| *H04N 7/18* | (2006.01) |
| *G11B 27/034* | (2006.01) |
| *G11B 27/10* | (2006.01) |
| *G11B 27/32* | (2006.01) |

(52) U.S. Cl.
CPC ............ *G11B 27/034* (2013.01); *G11B 27/105* (2013.01); *G11B 27/322* (2013.01)

(58) Field of Classification Search
CPC ... G11B 27/034; G11B 27/322; G11B 27/105
USPC .......................................................... 348/143
See application file for complete search history.

(56) References Cited

U.S. PATENT DOCUMENTS

| | | | |
|---|---|---|---|
| 5,642,285 A | 6/1997 | Woo et al. | |
| 6,636,256 B1 | 10/2003 | Passman et al. | |
| 6,741,790 B1 | 5/2004 | Burgess | |
| 6,744,403 B2 | 6/2004 | Milnes et al. | |
| 6,868,338 B1 * | 3/2005 | Elliott | 701/213 |
| 7,239,760 B2 * | 7/2007 | Di Bernardo et al. | 382/305 |
| 2002/0090217 A1 | 7/2002 | Limor et al. | |
| 2005/0073585 A1 | 4/2005 | Ettinger et al. | |

* cited by examiner

*Primary Examiner* — David X Yi
(74) *Attorney, Agent, or Firm* — Steven M. Greenberg; CRGO Law

(57) ABSTRACT

Embodiments of the present invention address deficiencies of the art in respect to video imagery assembly for course oriented activities and provide a method, system and computer program product for time stamped imagery assembly for course performance video replay. In an embodiment of the invention, a method for time stamped imagery assembly can include acquiring different images from different cameras disposed about an activity course traversed by a moving object and time stamping each of the different images. The method also can include repeatedly acquiring position and time stamp data for the moving object as the moving object traverses the activity course. Finally, the method can include assembling the different images acquired from the different cameras in a single sequence of images with positions in the sequence determined by correlating time stamps for each of the images with the acquired position and time stamp data of the moving object.

15 Claims, 2 Drawing Sheets

TIME STAMPED IMAGERY ASSEMBLY FOR COURSE PERFORMANCE VIDEO REPLAY

BACKGROUND OF THE INVENTION

1. Field of the Invention

The present invention relates to the field of image assembly for video replay and more particularly to image assembly for course performance video replay.

2. Description of the Related Art

Imagery has formed an integral part of experiential replay. Most ordinary people at one time or another have relied upon photographs and home video to recall a vacation, an event or other sort of experience. The advent of digital imagery including digital videography even further has opened opportunities for many to record and replay a past experience. Traditional videography relies solely on the capture of live video imagery with a suitable video capture device such as a digital video camera. Little if any editing of the individual frames will result leaving only raw footage for subsequent replay. Advanced hobbyists and professional videographers, however, capitalize on freely available video editing tools in order to dice and slice raw footage into a desirable arrangement of video images.

Videography also has proven to be an excellent tool in the context of sports performance training and analysis. Many sporting endeavors benefit from the benefit of post-activity review of video imagery of an activity. Examples include the video replay of a baseball player's swing, a tennis or golf player's swing, a skydiver's form, or the performance of unit of players such as a football or soccer squad, or a dance troupe. In most cases, a single camera suffices for providing an adequate view of an activity in question. However, some activities require a substantially large geographical area for instance, a boating event, a marathon or bicycle race, an automobile race, and the like. In those circumstances, multiple different pre-placed cameras will be required.

When multiple different cameras are required to adequately record an activity for playback, splicing together different images from different cameras can be an exhausting process. For professionally recorded activities, a full post-production facility will be required in which each frame can be manually inspected and spliced with other frames from other cameras to produce a composite video. In many cases, a choice is made simply to aggregate frames from the different cameras in different juxtaposed views so as to avoid splicing the frames into a single video. To do so, however, produces a complex video replay experience in which a review of the video leaves something to be desired.

BRIEF SUMMARY OF THE INVENTION

Embodiments of the present invention address deficiencies of the art in respect to video imagery assembly for course oriented activities and provide a novel and non-obvious method, system and computer program product for time stamped imagery assembly for course performance video replay. In an embodiment of the invention, a method for time stamped imagery assembly can include acquiring different images from different cameras disposed about an activity course traversed by a moving object and time stamping each of the different images. The method also can include repeatedly acquiring position and time stamp data for the moving object as the moving object traverses the activity course. Finally, the method can include assembling the different images acquired from the different cameras in a single sequence of images with positions in the sequence determined by correlating time stamps for each of the images with the acquired position and time stamp data of the moving object.

In another embodiment of the invention, a video assembly data processing system can be configured for time stamped imagery assembly for course performance video replay. The system can include a host computer supporting execution of an operating system and an image acquisition application executing in the host operating system acquiring different images with corresponding time stamps from different cameras disposed about an activity course. The system also can include a time stamp/position table including different time stamps each for a different position of a moving object traversing the activity course. Finally, the system can include a time stamped imagery assembly module. The module can include program code enabled to assemble the different images acquired from the different cameras in a single sequence of images with positions in the sequence determined by correlating time stamps for each of the images with position and time stamp data of the moving object in the time stamp/position table.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for time stamped imagery assembly for course performance video replay. In accordance with an embodiment of the present invention, images of a moving object traversing a course for an activity can be acquired from different cameras at different locations about the course. Each image can be acquired in association with a time stamp acquired, by way of example, from time data embedded in a GPS signal providing a geographic position of a camera acquiring the image, or by way of an internal clock synchronized to a GPS signal.

Concurrently, a position of the moving object can be repeatedly stored in connection with a time stamp for the position again, acquired by way of information in a GPS signal transmitted to a GPS receiver coupled to the moving object. Optionally, imagery can be captured by a camera coupled to the moving object. Thereafter, the images can be sorted according to a position of the moving object correlating to the time stamps and arranged in a single sequence images for video replay. In this way, a single video replay sequence can be assembled automatically without requiring a tedious manual post-production splicing of different images.

Figure 1:
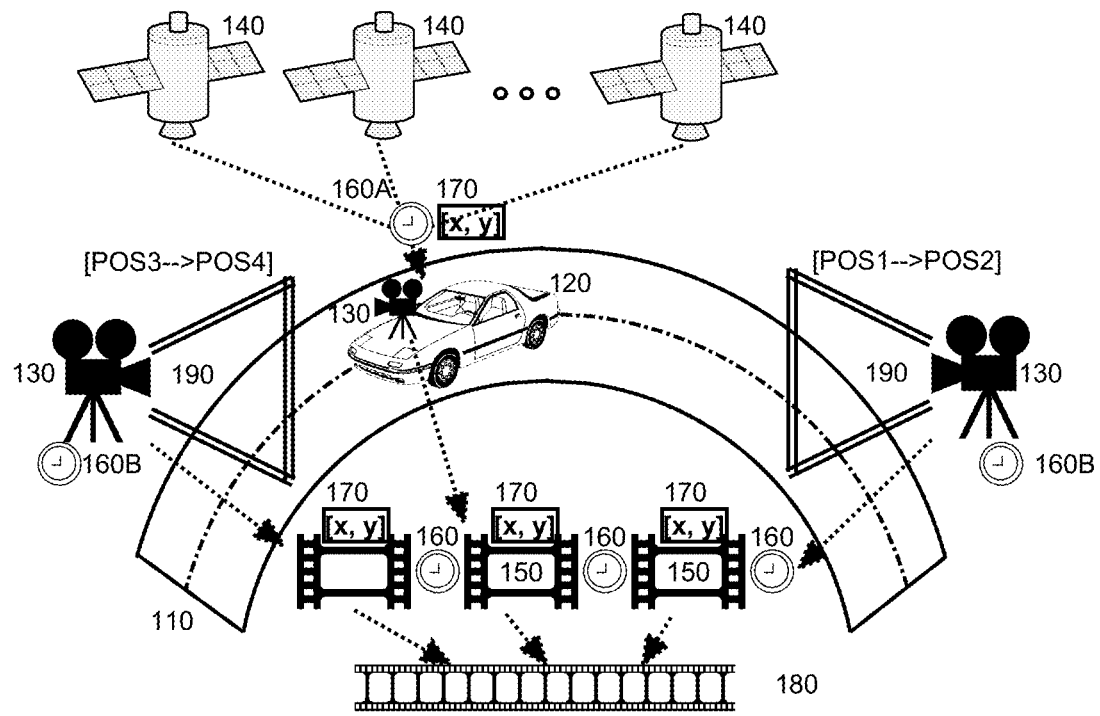
FIG. 1 is a pictorial illustration of a process for time stamped imagery assembly for course performance video replay.

In illustration, FIG. 1 pictorially shows a process for time stamped imagery assembly for course performance video replay. As shown in FIG. 1, a moving object 120, such as a vehicle, person or animal can traverse a course 110 for an activity such as an automobile track, horse race track or dog race track, cycling or snow-skiing course, battlefield for military exercises and the like. Different cameras 130 can be positioned about the course 110 each at a known geographic position, for example provided to each of the cameras 130 by way of a GPS receiver (not shown) communicating with a constellation of GPS satellites 140. Further, each of the cameras 130 can have a field of view 190 of the course 110 ranging from one geographic position to another. Further, one or more additional cameras 130 can be positioned in connection with the moving object 120. The additional camera 130 can include a GPS receiver (not shown), so as to permit the acquisition in real time from the GPS satellites 140 of a contemporaneous geographic position 170 of the moving object 120 along with a corresponding time stamp 160A.

As the moving object 120 traverses the course 110, images 150 can be acquired of the moving object 120 as the moving object 120 passes within the field of view 190 of each of the cameras 130. Of note, the field of view 190 can be fixed, or the field of view 190 can be variably controlled through a digital or optical zoom function included in one or more of the cameras 130. In this regard, the field of view 190 can be variably controlled response to detecting a position of the moving object 120 relative to a range of positions known to be visible within the field of view 190. Each of the images 150 can include a time stamp 160B associated with the images 150 at the time of image acquisition. A position 170 of the moving object 120 relative to the time stamp 160B can be determined and associated with the image 150 by correlating the time stamp 160B of the image 150 to a previously recorded geographic position 170 of the moving object 120 for the time stamp 160A. Subsequently, the images 150 can be sorted according to position 170 and arranged in a single sequence of images 180. Thus, the single sequence of images 180 can be replayed to provide a video replay of the moving object 120 traversing the course 110.

Figure 2:
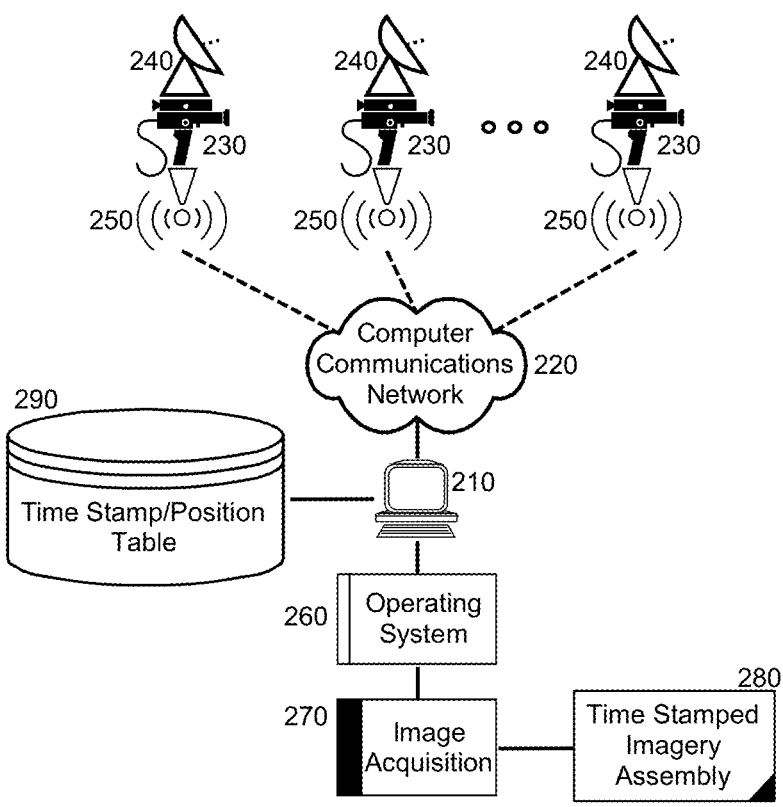
FIG. 2 is a schematic illustration of a video assembly data processing system configured for time stamped imagery assembly for course performance video replay; and, FIG. 3 is a flow chart illustrating a process for time stamped imagery assembly for course performance video replay.

The process described in connection with FIG. 1 can be embodied within a video assembly data processing system. In yet further illustration, FIG. 2 is a schematic illustration of a video assembly data processing system configured for time stamped imagery assembly for course performance video replay. The system can include a host computing system 210 supporting the execution of an operating system 260 and can be configured for coupling over computer communications network 220 to multiple different cameras 230 disposed about a course and coupled to the computer communications network 220, for example by way of a wirebound network connection, or by way of respective wireless transceivers 250. Optionally, each of the cameras further can be coupled to a GPS location device 240, though at least one of the cameras can be configured for coupling to a moving object with a position locating system such as a GPS location device enabled to repeatedly acquire both a position and time stamp for the moving object as the moving object traverses the course.

The operating system 260 can support the execution of an image acquisition application configured to acquire imagery from the different cameras 230 over the computer communications network 220. Each of the images can include at least a time stamp corresponding approximately to a time of acquiring the image. Time stamped imagery assembly module 280 can be coupled to the image acquisition application 270. The time stamped imagery assembly module 280 can include program code enabled to receive time stamp and position data from at least one of the cameras 230 associated with the moving object for storage in time stamp/position table 290. The program code further can be enabled to correlate time stamps for different images received from the cameras 230 to a position of the moving object by reference to the time stamp/position table 290. Finally, the program code can be enabled to arrange each of the different images according to the correlated position. In this way, a video replay of the moving object traversing the course can be assembled from different images acquired by the different cameras 230.

Figure 3:
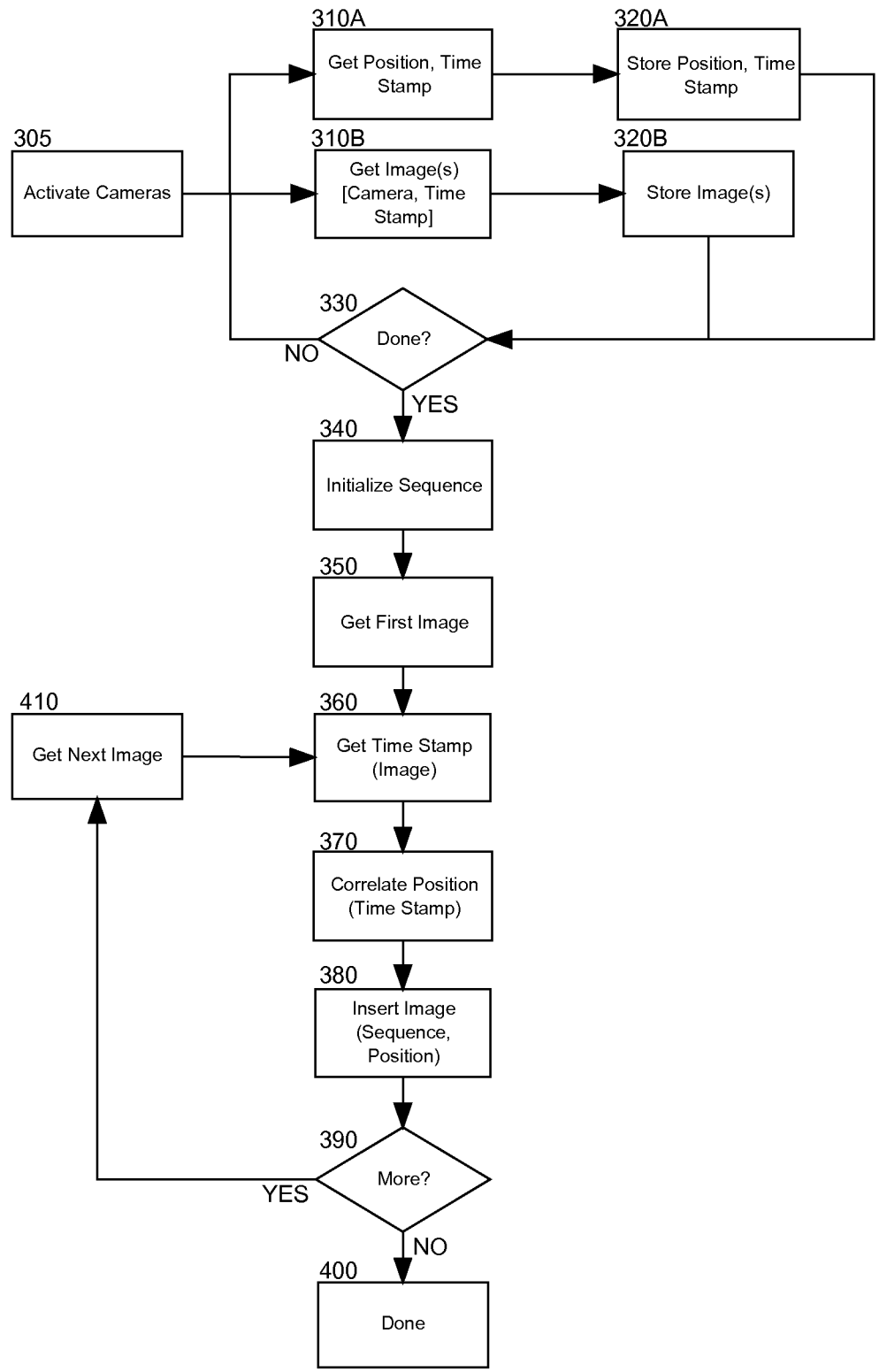

In further illustration of the operation of the time stamped imagery assembly module 260, FIG. 3 is a flow chart illustrating a process for time stamped imagery assembly for course performance video replay. Beginning in block 305, cameras disposed about a course of activity can be activated to acquire imagery within a field of view of respective ones of the cameras. Optionally, a camera can be activated to acquire both imagery from the moving object and also to acquire time and position data for the moving object (though it is to be understood that a camera is not required to be coupled to the moving object so long as time and position data can be acquired by way of position location device coupled to the moving object, such as a GPS receiver).

In block 310A, a position and time stamp can be acquired for a position of the moving object as the moving object traverses an activity course. Also, in block 310B, one or more images can be acquired by one or more of the cameras of the moving object. In this regard, each of the cameras can continuously acquire imagery, or each of the cameras can acquire imagery only when detecting a presence of the moving object within a field of view of the camera. Optionally, as the moving object passes within the field of view of a given one of the cameras, the focal length of the lens of the camera can automatically increase to zoom in on the moving object thereby providing a closer image of the moving object. In any circumstance, in block 320A, the position and time stamp data acquired for the moving object can be stored in a table of time stamps and positions and in block 320B, the images can be stored in a data store of images, each image being stored with meta data reciting a time stamp for acquiring the image and optionally an identity and/or position of the camera acquiring the image.

In block 330, it can be determined whether the moving object has completed a traversal of the course. If not, the process can repeat through blocks 310A and 310B. Otherwise, the process can continue through block 340. In block 340, a sequence of images can be initialized to store images in sorted order and in block 350 a first image in the data store of imagery can be retrieved for processing. In block 360, a time stamp for the retrieved image can be determined and in block 370 the time stamp can be correlated to a position of the moving object on the course by reference to the time stamp/position table. In block 380, the retrieved image can be inserted into the sequence of images in an order commensurate with the correlated position. Thereafter, in block 390, if additional images in the data store remain to be processed, in block 410 the next image in the data store can be retrieved for processing and the process can repeat through block 360.

Otherwise, the process can end in block 400 resulting in a sequence of images representative of a video replay of the moving object traversing the course.

It will be understood by the skilled artisan that the process described in connection with FIG. 3 is merely exemplary of one possible algorithm for time stamped imagery assembly and other algorithms of more or less efficiency are possible. Examples include sorting all images in the data store of imagery by time stamp or by position. Further, it is to be recognized that GPS supplied time stamp information represents only one method for uniformly applying time stamps to images and other methodologies can suffice including the use of synchronized clocks for each of the cameras disposed about the course.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A method for time stamped imagery assembly comprising:
    acquiring different images from different cameras disposed about an activity course traversed by a moving object;
    time stamping each of the different images;
    repeatedly acquiring position and time stamp data for the moving object as the moving object traverses the activity course; and,
    assembling the different images acquired from the different cameras in a single sequence of images with positions in the sequence determined by correlating time stamps for each of the images with the acquired position and time stamp data of the moving object.

2. The method of claim 1, wherein acquiring different images from different cameras disposed about an activity course traversed by a moving object, further comprises additionally acquiring images from a camera coupled to the moving object.

3. The method of claim 1, wherein acquiring different images from different cameras disposed about an activity course traversed by a moving object, further comprises changing a focal length of a lens of at least one of the cameras as the moving object passes within a field of view of the at least one of the cameras.

4. The method of claim 1, wherein time stamping each of the different images, comprises, for each of the different images, extracting a time stamp from a global positioning system (GPS) signal received in an acquiring one of the different cameras.

5. The method of claim 1, wherein repeatedly acquiring position and time stamp data for the moving object as the moving object traverses the activity course, comprises repeatedly acquiring position and time stamp data for the moving object by way of global positioning system data for the moving object as the moving object traverses the activity course.

6. The method of claim 1, further comprising replaying the single sequence of images as a video replay of the moving object traversing the activity course.

7. A video assembly data processing system configured for time stamped imagery assembly for course performance video replay, the system comprising:
    a host computer supporting execution of an operating system;
    an image acquisition application executing in the host operating system acquiring different images with corresponding time stamps from different cameras disposed about an activity course;
    a time stamp and position table comprising different time stamps each for a different position of a moving object traversing the activity course; and,
    a time stamped imagery assembly module comprising program code enabled to assemble the different images acquired from the different cameras in a single sequence of images with positions in the sequence determined by correlating time stamps for each of the images with position and time stamp data of the moving object in the time stamp/position table.

8. The system of claim 7, wherein the activity course is a race track.

9. The system of claim 7, wherein the activity course is a cycling or snow-skiing course.

10. The system of claim 7, wherein at least one of the cameras is coupled to a global positioning system (GPS) receiver coupled to the moving object and repeatedly providing an acquired position and corresponding time stamp to the time stamp and position table.

11. A computer program product comprising a non-transitory computer usable storage medium storing computer usable program code for time stamped imagery assembly, the computer program product comprising:
    computer usable program code for acquiring different time stamped images from different cameras disposed about an activity course traversed by a moving object;

computer usable program code for repeatedly acquiring position and time stamp data for the moving object as the moving object traverses the activity course; and, computer usable program code for assembling the different images acquired from the different cameras in a single sequence of images with positions in the sequence determined by correlating time stamps for each of the images with the acquired position and time stamp data of the moving object.

12. The computer program product of claim 11, wherein the computer usable program code for acquiring different images from different cameras disposed about an activity course traversed by a moving object, further comprises computer usable program code for additionally acquiring images from a camera coupled to the moving object.

13. The computer program product of claim 11, wherein the computer usable program code for acquiring different images from different cameras disposed about an activity course traversed by a moving object, further comprises computer usable program code for changing a focal length of a lens of at least one of the cameras as the moving object passes within a field of view of the at least one of the cameras.

14. The computer program product of claim 11, wherein the computer usable program code for repeatedly acquiring position and time stamp data for the moving object as the moving object traverses the activity course, comprises computer usable program code for repeatedly acquiring position and time stamp data for the moving object by way of global positioning system data for the moving object as the moving object traverses the activity course.

15. The computer program product of claim 11, further comprising computer usable program code for replaying the single sequence of images as a video replay of the moving object traversing the activity course.

* * * * *